United States Patent
Alaiwan et al.

(10) Patent No.: US 9,832,488 B2
(45) Date of Patent: Nov. 28, 2017

(54) VIDEO STREAM GENERATOR

(71) Applicants: Sébastien Alaiwan, Grenoble (FR); Frédéric Barbier, Grenoble (FR)

(72) Inventors: Sébastien Alaiwan, Grenoble (FR); Frédéric Barbier, Grenoble (FR)

(73) Assignee: Allegro DVT, Meylan (FR)

( * ) Notice: Subject to any disclaimer, the term of this patent is extended or adjusted under 35 U.S.C. 154(b) by 234 days.

(21) Appl. No.: 14/632,488

(22) Filed: Feb. 26, 2015

(65) Prior Publication Data
US 2015/0249844 A1    Sep. 3, 2015

(30) Foreign Application Priority Data
Feb. 28, 2014 (FR) ...................... 14 51634

(51) Int. Cl.
| | |
|---|---|
| *H04N 7/12* | (2006.01) |
| *H04N 19/89* | (2014.01) |
| *H04N 17/00* | (2006.01) |
| *H04N 19/517* | (2014.01) |
| *H04N 19/50* | (2014.01) |
| *H04N 19/70* | (2014.01) |

(52) U.S. Cl.
CPC .......... *H04N 19/89* (2014.11); *H04N 17/004* (2013.01); *H04N 19/517* (2014.11); *H04N 19/50* (2014.11); *H04N 19/70* (2014.11)

(58) Field of Classification Search
CPC ....................................................... H04N 19/89
See application file for complete search history.

(56) References Cited

U.S. PATENT DOCUMENTS

| | | | |
|---|---|---|---|
| 5,706,002 A | 1/1998 | Meehan et al. | |
| 7,076,392 B1 | 6/2006 | Wilson | |
| 2011/0299629 A1* | 12/2011 | Luby ................. | H03M 13/3761 375/299 |
| 2012/0084538 A1* | 4/2012 | Alapati ............... | G06F 11/2236 712/227 |
| 2013/0272389 A1* | 10/2013 | Sze .................. | H04N 19/00121 375/240.03 |
| 2014/0092985 A1* | 4/2014 | Kim ..................... | H04N 19/129 375/240.25 |

(Continued)

FOREIGN PATENT DOCUMENTS

| | | |
|---|---|---|
| JP | 2008131484 | 6/2008 |
| KR | 20100087908 | 8/2010 |

OTHER PUBLICATIONS

Preliminary Research Report, FR Patent Application No. 1451634, dated Oct. 30, 2014.

(Continued)

*Primary Examiner* — Tracy Y Li
(74) *Attorney, Agent, or Firm* — Moreno IP Law LLC (57) ABSTRACT

The invention concerns a test stream generator for generating a compressed video stream for testing a video decoder, the generator including: a context-aware pseudo-random generator (202) adapted to generate pseudo-random values of syntax elements based on decoding context data; a decoding process module (206, 206') adapted to process the syntax element values and to generate the decoding context data and binarization context data; and a binarizer module (204) adapted to encode the syntax element values based on the binarization context data in order to generate the compressed video stream.

15 Claims, 3 Drawing Sheets

(56) References Cited

U.S. PATENT DOCUMENTS

2014/0334539 A1* 11/2014 Kim ................. H04N 19/91
  375/240.03
2014/0376643 A1* 12/2014 Hendrry ............ H04N 19/13
  375/240.26

OTHER PUBLICATIONS

"Constrained-Random Bitstream Generation for H.264/AVC Decoder Conformance Test"; Jinhyun Cho, Soonwoow Choi and Soo-Ik Chae; IEEE Transactions on Consumer Electronics, vol. 56, No. 2, May 2010; 8 pgs.

European Search Report, dated Jul. 28, 2015; filed in EP 15 15 6320; 9 pages.

\* cited by examiner

VIDEO STREAM GENERATOR

FIELD

The present disclosure relates to the field of methods and devices for generating test video streams, and in particular for generating a compressed video stream suitable for testing a video decoder.

BACKGROUND

Video encoding standards, such as the H.264 ISO standard MPEG4 AVC, and the MPEG HEVC (High Efficiency Video Coding) standard, define many different operating modes. A video decoder designed to decode video compressed according to such a video encoding standard should generally be capable of correctly decoding video under all operating modes.

In order to permit a designer to rigorously test the design of a decoder during the development phase, it has been proposed to apply a test stream, i.e. a video stream compressed according to the relevant standard, to the decoder. The decompressed video output generated by the decoder is then compared with a reference video output that is known be the correct decompression of the test stream. The test stream should thoroughly cover the operating modes of the decoder that are to be tested.

Current solutions for generating test streams for a given encoding standard have drawbacks in terms of test coverage and/or the conception time. Indeed, the production of a test stream having a relatively complete test coverage is currently a slow process, leading to a relatively high time-to-market for video decoders based on new encoding standards.

SUMMARY

It is an aim of embodiments of the present invention to at least partially address one or more drawbacks in the prior art.

According to one aspect, there is provided a test stream generator for generating a compressed video stream for testing a video decoder, the generator comprising: a context-aware pseudo-random generator adapted to generate pseudo-random values of syntax elements based on decoding context data; a decoding process module adapted to process the syntax element values and to generate the decoding context data and binarization context data; and a binarizer module adapted to encode the syntax element values based on the binarization context data in order to generate said compressed video stream.

According to one embodiment, the decoding process module is further adapted to generate a decompressed video output based on the syntax element values.

According to one embodiment, the binarizer module and the decoding process module are adapted to process the syntax elements according to the HEVC (high efficiency video coding) standard.

According to one embodiment, the context-aware pseudo-random generator is adapted to generate one or more of the pseudo random values based on a probability distribution law, the test stream generator further comprising a coverage controller adapted to define at least part of said probability distribution law for one or more of said syntax elements.

According to one embodiment, the coverage controller is adapted to generate the probability distribution law based on the decoding context data and based on coverage context data indicating non-covered items to be covered by the decoding process module.

According to one embodiment, the test stream generator further comprises a coverage analysis module adapted to generate the coverage context data based on one or more notifications provided by the decoding process module indicating the extent of test coverage.

According to one embodiment, the one or more pseudo-random values are values to be used for the calculation of one or more motion vectors by the decoding process module, the motion vectors are used by the decoding process module to select zones of a reference image, and the coverage context data indicates one or more zones of the reference image not yet selected and to be covered by the test stream.

According to a further aspect, there is provided a method of generating, by a test stream generator, a compressed video stream for testing a video decoder, the method comprising: generating, by a context-aware pseudo-random generator, pseudo-random values of syntax elements based on decoding context data; processing, by a decoding process module, the syntax element values to generate the decoding context data and binarization context data; and encoding, by a binarizer module, the syntax element values based on the binarization context data in order to generate said compressed video stream.

According to one embodiment, the method further comprises requesting, by the decoding process module, the syntax element values from the context-aware pseudo-random generator.

According to one embodiment, generating the one or more pseudo-random values by the context-aware pseudo-random generator is based on a probability distribution law, the method further comprising defining, by a coverage controller, at least part of the probability distribution law for one or more of the syntax elements.

According to one embodiment, generating the probability distribution law by the coverage controller is based on the decoding context data and on coverage context data indicating non-covered items to be covered by the decoding process module.

According to one embodiment, the method further comprises generating, by a coverage analysis module, the coverage context data based on one or more notifications provided by the decoding process module indicating the extent of test coverage.

According to one embodiment, the one or more pseudo-random values are values to be used for the calculation of one or more motion vectors by the decoding process module, the motion vectors are used by the decoding process module to select zones of a reference image, and the coverage context data indicates one or more zones of the reference image not yet selected and to be covered by the test stream.

According to a further aspect, there is provided a method of testing a decoder comprising: generating a compressed video stream according to the above method; decoding, by the decoder, the compressed video stream to generate a decompressed video output; and comparing the decompressed video output with a reference video output.

According to one embodiment, the method further comprises generating, by the decoding process module, the reference video output.

BRIEF DESCRIPTION OF THE DRAWINGS

The foregoing and other features and advantages will become apparent from the following detailed description of embodiments, given by way of illustration and not limitation with reference to the accompanying drawings, in which.

DETAILED DESCRIPTION

Throughout the following description, embodiments of a compressed video stream generator are described that are based on the MPEG HEVC (High Efficiency Video Coding) standard. The specification describing the HEVC standard is for example published by the ITU (International Telecommunications Union) as recommendation ITU-T H.265, entitled: "High efficiency video encoding, SERIES H: AUDIOVISUAL AND MUTLIMEDIA SYSTEMS, Infrastructure of audiovisual services—Coding of moving video", April 2013, the contents of which is hereby incorporated by reference to the extent allowable by the law. A paper providing an overview of this standard is entitled "Overview of the High Efficiency Video Coding (HEVC) Standard", G. Sullivan et al., Pre-publication draft to appear in IEEE Trans. on circuits and systems for video technology, Dec. 2012, the contents of which is also hereby incorporated by reference to the extent allowable by the law.

It will be apparent to those skilled in the art how the embodiments described herein could be adapted to other syntax-based compression standards. As will be described in more detail hereafter, a syntax-based compression standard is one that uses syntax elements to represent various aspects of a video stream. For example, the test stream generator could be adapted to generate test streams according to the H.264 ISO standard MPEG4 AVC, the MPEG-2 video standard or the VP9 standard.

Figure 1:
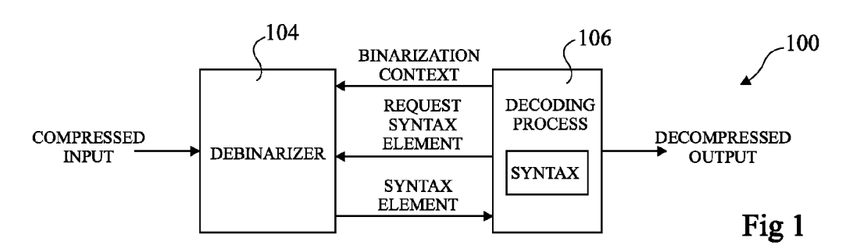
FIG. 1 schematically illustrates an example of a video decoder based on syntax.

FIG. 1 schematically illustrates a syntax-based decoder 100 according to an example embodiment. Syntax-based decoding involves two main operations: debinarization performed by a debinarizer module (DEBINARIZER) 104 followed by a decoding process performed by a decoding process module (DECODING PROCESS) 106.

Debinarization involves generating syntax elements (SYNTAX ELEMENT) based on a compressed input video stream (COMPRESSED INPUT). In particular, requests for syntax elements (REQUEST SYNTAX ELEMENT) are received from the decoding process module 106, along with binarization context data (BINARIZATION CONTEXT).

A syntax element is an element of data associated with the video stream, which indicates a parameter, like the video resolution, a prediction mode, a filter coefficient, or any other data representing the video stream. The syntax values of the HEVC standard are defined in clause 7 from page 28 to page 52 of the publication referenced above.

The binarization context provides a mapping between syntax element values and bit sequences. This mapping may evolve during the decoding process in order to achieve a better compression. This mapping is fully specified in the relevant compression standard.

In the HEVC standard, the binarization context data represents the probabilities of values of the syntax elements, and permits CABAC (context adaptive binary arithmetic coding) decoding to be performed by the debinarizer module 104. As will be understood by those skilled in the art, CABAC entropy coding is a binarization technique that involves using context modeling to provide conditional probability estimates that are in turn used to compress a sequence of syntax elements into a sequence of data bits. Debinarization is the reverse operation in which the sequence of data bits is processed, based on the binarization context data, to recreate the syntax elements.

The decoding process performed by the module 106 involves processing the syntax elements, requested from the debinarizer module 104, to generate the decompressed video stream (DECOMPRESSED OUTPUT).

A test video stream compressed according the HEVC standard or any other syntax-based standard and suitable for testing a corresponding decoder, such as the decoder 100 of FIG. 1, could be generated by an encoder based on an input uncompressed video input. However, a drawback of such an approach is that it is time consuming and difficult to ensure full test coverage.

Figure 2:
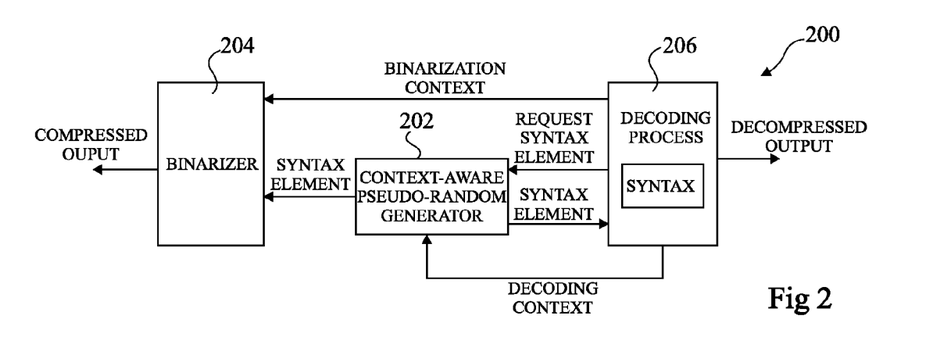
FIG. 2 schematically illustrates a test stream generator according to an example embodiment of the present disclosure.

FIG. 2 schematically illustrates a test stream generator 200 according to an example embodiment.

The generator 200 comprises a context-aware pseudo-random generator (CONTEXT-AWARE PSEUDO-RANDOM GENERATOR) 202, a binarizer module (BINARIZER) 204, and a decoding process module (DECODING PROCESS) 206.

The decoding process module 206 for example performs the same functions as the corresponding block 106 of FIG. 1. Additionally, the module 206 provides decoding context data (DECODING CONTEXT) to the generator 202. In the HEVC standard, the decoding context data represents, for example, the number of blocks already decoded in the current image, the resolution, the number of reference images available, etc. When a new syntax element is injected into the decoding process module 206, this will cause the state of the module 206 to be updated, thereby modifying the decoding context data.

In some embodiments, a decompressed video output (DECOMPRESSED OUTPUT) is generated by the decoding process module 206 based on the syntax elements, and this decompressed video output is used as a reference video output when subsequently testing a decoder.

The context-aware pseudo-random generator 202 receives requests for syntax elements (REQUEST SYNTAX ELEMENT) from the decoding process module 206, along with the decoding context data. In response, the pseudo-random generator 202 generates, for each requested syntax element, a pseudo-random value that falls within an associated range of the syntax element, and provides the values to both the binarizer module 204 and to the decoding process module 206. Based on the syntax element, and on the binarization context data (BINARIZATION CONTEXT) from the decoding process module 206, the binarizer module 204 is then capable of generating a compressed output stream (COMPRESSED OUTPUT), which forms the test stream.

Figure 3:
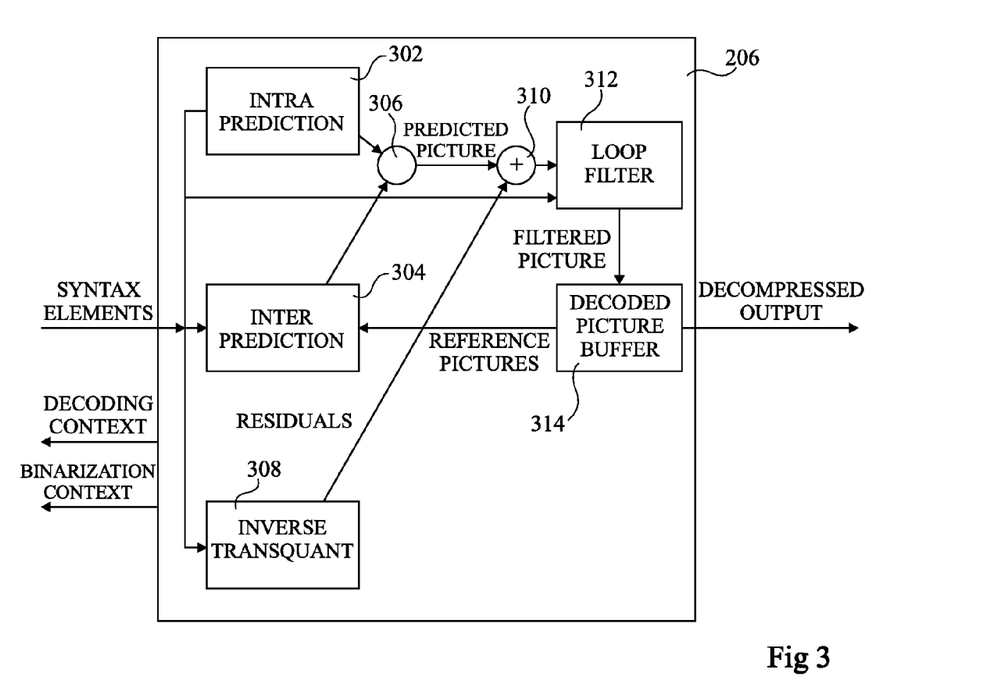
FIG. 3 schematically illustrates in greater detail a decoding process module of the test stream generator of FIG. 2 according to an example embodiment of the present disclosure.

FIG. 3 schematically illustrates the decoding process module 206 of FIG. 2 in more detail according to an example in which it applies decoding according to the HEVC standard. As illustrated, this module for example comprises an intra prediction block (INTRA PREDICTION) 302 and an inter prediction block (INTER PREDICTION) 304, each of which receives the syntax elements from the context-aware pseudo-random generator 202. The outputs of the blocks 302 and 304 are combined at a block 306 to provide predicted pictures (PREDICTED PICTURE). An inverse transquant block (INVERSE TRANSQUANT) 308 also receives the syntax elements, and generates data (RESIDUALS) having the dimensions of an image, but which corresponds to the difference between two images in order to correct the predicted picture. The output of the inverse transquant block 308 is provided to an adder 310, which adds this output to the predicted pictures. The output of the adder 310 is provided to a loop filter (LOOP FILTER) 312, along with the syntax elements, which provides filtered pictures (FILTERED PICTURE) to a decoded picture buffer (DECODED PICTURE BUFFER) 314, which in turn provides the decompressed video output. The decoded picture buffer 314 also provides reference pictures (REFERENCE PICTURES) to the inter prediction block 304.

The decoding process module 206 also outputs the decoding context data, which for example corresponds to the state of the decoding process module, and the binarization context data, which for example, according to the HEVC standard, corresponds to the frequency and/or probability of certain syntax element values. This data is for example updated each time a new syntax element is injected into the module 206.

Figure 4:
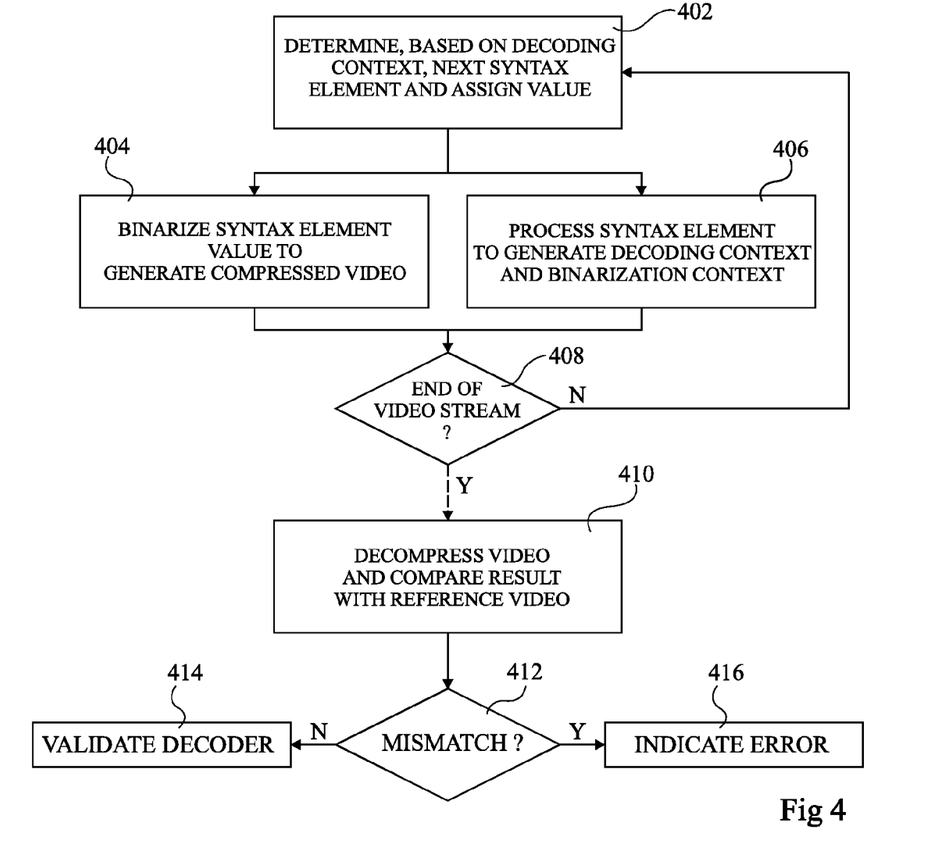
FIG. 4 is a flow diagram illustrating operations in a method of generating a compressed video stream for testing a video decoder according to an example embodiment of the present disclosure.

FIG. 4 is a flow diagram illustrating examples of operations in a method of generating a test video stream based on the test stream generator 200 of FIG. 2.

In a first operation 402, a next syntax element is requested by the decoding process module 206, based on the decoding context and/or based on the specification of the relevant standard. For example, for a first syntax element, the initial state of the decoding process module 206 before it has received the first bit of a stream is determined by the specification of the video decoding standard alone, and this indicates which first syntax element should be requested. Subsequently, the syntax elements to be requested are determined partially or entirely by the decoding context data.

The context-aware pseudo-random generator 202 then generates the requested syntax element and supplies it to both the decoding process module 206 and the binarizer module 204. In particular, the generator 202 for example generates a pseudo-random value for the syntax element while respecting any constraint imposed on the syntax element by the decoding context data. For example, the decoding context data may indicate that a certain syntax element should have a value in the range 0 to 7, and the generator 202 will thus pseudo-randomly generate a value in this range.

As a more specific example, in the case of a PCM (pulse code modulation) sample syntax of the HEVC standard, a request for luma and chroma sample values for each of the pixels of a coding block may be made. Clause 7.3.8.7 of the HEVC standard referenced above defines the PCM sample as follows:

```
"pcm_sample( x0, y0, log2CbSize){
    for(i=0; i<1<<(log2CbSize << 1);i++)
        pcm_sample_luma[i]           u(v)
    for(i=0; i<(1<<(log2CbSize << 1))>>1;i++)
        pcm_sample_chroma[i]         u(v)
}"
```

The term "log 2CbSize" defines the size of the coding block. For example, a value of 3 would correspond to an 8 by 8 pixel block. Each sample is defined by a descriptor "u(v)", which means that it has a number of bits defined by another syntax element, and this parameter for example forms part of the decoding context data. The generator 202 thus generates a random value for each of the PCM luma and chroma samples of an appropriate number of bits.

The operation 402 is followed by an operation 404 performed by the binarizer module 204 and an operation 406 performed by the decoding process module 206. These operations may be performed in parallel with each other or in series.

In operation 404, the syntax element generated by the generator 202 is encoded by the binarizer module 204 to provide bits of the compressed video stream for testing a decoder. For this, the binarizer module 204 also for example receives, in addition to the syntax elements from the generator 202, binarization context data from the decoding process module 206.

In operation 406, the syntax element from the generator 202 is processed by the decoding process module 206 to generate new decoding context data and new binarization context data. Furthermore, in some embodiments, the decoding process module 206 also generates, based on the syntax element, pixels of a decompressed video output that for example provides a reference video output for testing the decoder.

In a subsequent operation 408, it is determined whether the end of the video stream has been reached. For example, the context-aware pseudo-random generator 202 is configured to generate a certain number of frames of test data. If not all of these frames have been generated, the method for example returns to operation 402 in order that the next syntax element is identified and generated.

If, however, it is determined in operation 406 that the end of the video stream has been reached, in some embodiments, the method ends. For example, the compressed video stream, and optionally the decompressed video output, are stored on a digital storage medium for later use in testing a decoder.

Alternatively, the method continues with a subsequent operation 410, in which the compressed video stream is provided to the decoder that is to be tested. The decoder decompresses the test video stream, and the result is for example compared to a reference video output.

In a subsequent operation 412, it is determined whether the comparison performed in operation 410 indicates any mismatch between the video streams. If not, the decoder design is for example validated in a subsequent operation 414. Alternatively, if any mismatch is found, the error is for example indicated in an operation 416. The part of the decoder from which the error originated is for example identified based on the location of the error in the video output.

It will be apparent to those skilled in the art that the test stream generator 200 may be implemented entirely or partially by a specific hardware circuit, such as an ASIC (Application Specific Integrated Circuit) or FPGA (field programmable gate array) and/or by software executed by a suitable processing device.

Figure 5:
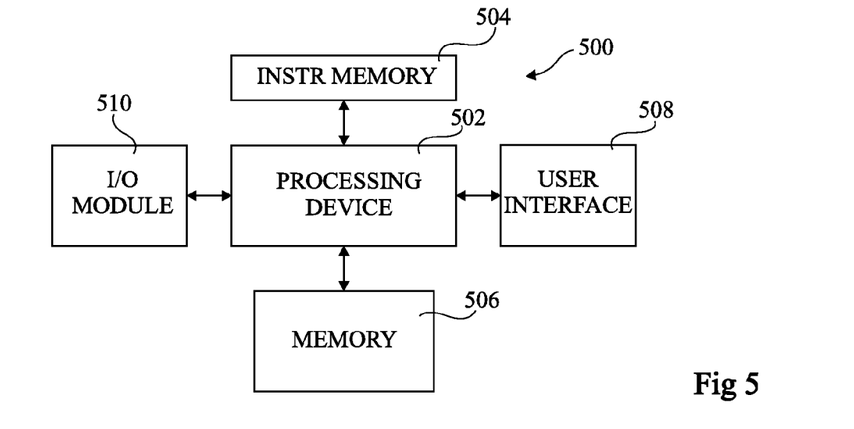
FIG. 5 schematically illustrates hardware for implementing at least some parts of test stream generator according to an example embodiment of the present disclosure.

FIG. 5 illustrates an example of hardware 500 comprising a processing device (PROCESSING DEVICE) 502 suitable for implementing, based on software, at least some of the functions of the test stream generator 200.

The processing device 502 comprises one or more processors under the control of software instructions stored in an instruction memory (INSTR MEMORY) 504. The processing device 502 is also coupled to a memory (MEMORY) 506, which for example at least temporarily stores the generated syntax elements, the context data, the decompressed video output and/or the compressed video stream. A user interface (USER INTERFACE) 508 is also for example provided, allowing an operator to adapt certain parameters, such as to impose or remove restrictions on certain of the syntax elements.

Furthermore, a communications interface (I/O MODULE) 510 may be coupled to the processing device 502 allowing the test stream and decompressed video output to be transmitted to a remote station used for testing a decoder.

Figure 6:
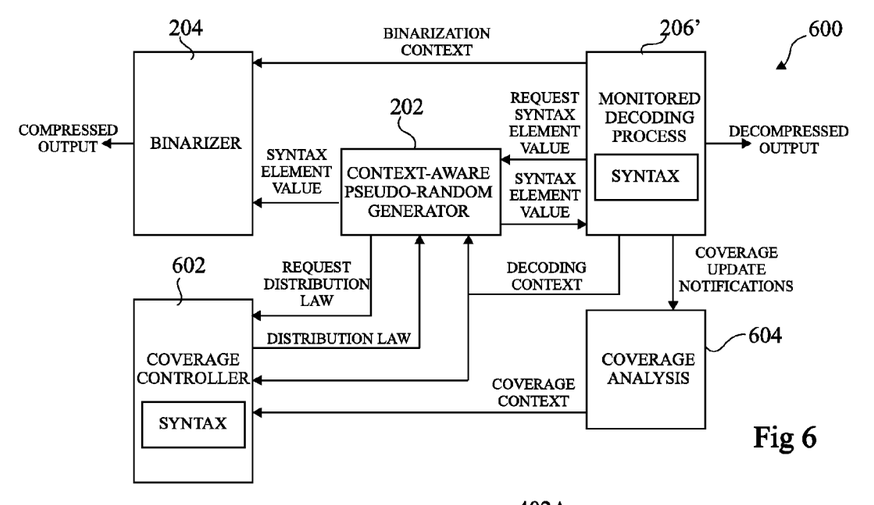
FIG. 6 schematically illustrates a test stream generator according to a further example embodiment of the present disclosure.

FIG. 6 schematically illustrates a test stream generator 600 according to a further embodiment. Elements in common with the embodiment of FIG. 2 have been labelled with like references and will not be described again in detail.

In the embodiment of FIG. 6, the test coverage provided by the generated test stream is monitored and adapted in order to improve the extent of test coverage and/or reduce the length of the test sequence for obtaining a desired test coverage.

The decoding process module 206 is replaced in the embodiment of FIG. 6 by a monitored decoding process module (MONITORED DECODING PROCESS) 206', which provides the decoding context data not only to the context-aware pseudo-random generator 202, but also to a coverage controller (COVERAGE CONTROLLER) 604. The module 206' also provides coverage update notifications (COVERAGE UPDATE NOTIFICATIONS) to a coverage analysis module (COVERAGE STATISTICS) 604, which for example aggregates the notifications to provide coverage statistics based on which it generates coverage context data (COVERAGE CONTEXT). The coverage context data is provided to the coverage controller 602. The coverage controller 602 receives requests for syntax element distribution laws (REQUEST DISTRIBUTION LAW) from the pseudo-random generator 202, and responds by providing syntax element distribution laws (DISTRIBUTION LAW) to the generator 202, based on the decoding context data and on the coverage context data. Such a request is for example made for each syntax element, or for only some selected syntax elements.

The coverage update notifications provided by the module 206' for example comprise an indication of one or more newly covered items, such as the values of particular computations made according to the relevant video standard, the outcomes of decisions made according to the relevant video standard, and indices of hit values of tables of the video standard.

The coverage analysis module 604 aggregates the coverage update notifications provided by the module 206', compares what has been covered with a list indicating the potential items to be covered according to the relevant video standard, and generates a list of the currently uncovered items. This list of uncovered items for example forms the coverage context data.

Operation of the circuit of FIG. 6 will now be described in more detail with reference to FIG. 7.

Figure 7:
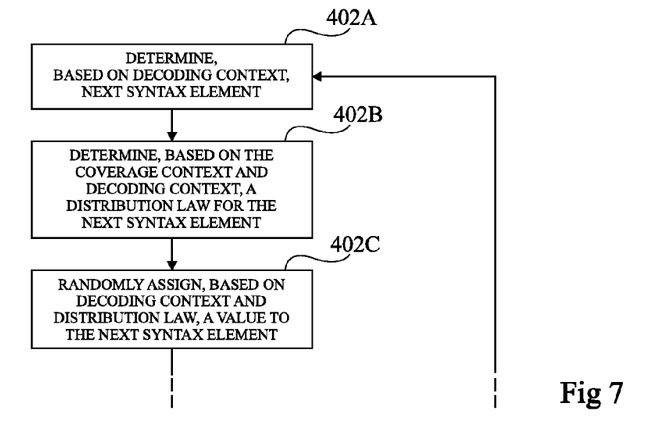
FIG. 7 is a flow diagram illustrating a step of the method of FIG. 4 in more detail according to an example embodiment.

FIG. 7 is a flow diagram illustrating the operation 402 of FIG. 4 in more detail for the case that the syntax generator 600 of FIG. 6 is used.

In an operation 402A, a next syntax element is determined by the monitored decoding process module 206', based on decoding context.

In an operation 402B, the coverage controller 602 determines, for example in response to a request from the pseudo-random generator 202, a distribution law to be used by the generator 202 to randomly compute the value of the next syntax element. This distribution law is for example determined based on the coverage context data and the decoding context data. For example, the distribution law is selected in order to increase the probability of a syntax element value occurring that will lead to one or more uncovered items being covered.

In some embodiments, the distribution law defines, for each potential value of the syntax element, the probability that this value will be selected. For example, by default, the distribution law for selecting the value of syntax elements corresponds to a normal distribution in which each value has equal probability of occurrence. This distribution law is for example modified by the coverage controller 602 to favorize one or more specific values and/or one or more ranges of values. For example, for a given syntax element having potential values of between 0 and 255, it may be that the values at multiples of 50 are of particular interest for testing, in other words the value 0, 50, 100, 150, 200 and 250. Assuming that the values of 50, 100 and 150 have already been covered, the distribution law may be modified to favorize the values of 0, 200 and 250, for example by assigning a relative high probability of occurrence to these values, and a relatively low probability of occurrence to all other values. Alternatively, a certain range of values of the syntax elements may be of interest, and the probability distribution may have a peak occurring in this range.

In an operation 402C, a value is assigned to the next syntax element by the pseudo-random generator 202 based on the decoding context data and on the distribution law provided by the coverage controller 602. This value is then transmitted to the monitored decoding process module 206' to be used as the current value of the syntax element.

The method for example then proceeds with the operations 404, 406 and 408 of the test stream generation method of FIG. 4, and optionally with the operations 410, 412, 414 and 416 of the decoder validation method. In the operation 406, not only is the decoding context updated, but coverage update notifications are for example generated in order to update the coverage statistics.

An example application of the method of controlling test coverage will now be described with reference to FIGS. 8A and 8B for the case that the syntax elements relate to motion vectors according to a video standard such as MPEG4 AVC.

Figure 8A:
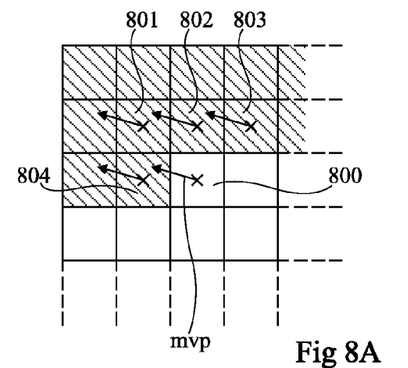
FIG. 8A illustrates part of an image during processing according to an example embodiment.

FIG. 8A illustrates part of a picture divided into macroblocks, each macroblock for example corresponding to a block of 16 by 16 pixels. During decoding, the macroblocks are for example decoded in a raster scan order starting at the top left corner of each image. The monitored decoding process module 206' for example calculates a motion vector for each macroblock. Examples of the motion vectors are represented by arrows in FIG. 8A. Each motion vector selects a zone of the reference image to be used for decoding a current macroblock. Each motion vector for example comprises an x component mv[0] and a y component mv[1] determined based on the following equations:

$$mv[0]=mvp[0]+mvd[0]$$

$$mv[1]=mvp[1]+mvd[1]$$

where mvp[0] is the x component of a motion vector predictor, mvd[0] is the x component of a motion vector difference, mvp[1] is the y component of a motion vector predictor and mvd[1] is the y component of a motion vector difference.

The motion vector predictor mvp is for example calculated based on the motion vectors of one or more previously decoded macroblocks. In one example, for a given macroblock, such as the one labelled 800 in FIG. 8A, the motion vector predictor is calculated based on the motion vector of the three macroblocks, labelled 801, 802 and 803, and of the macroblock to its left, labelled 804. The values of mvd[0] and mvd[1] are for example determined based on the following four syntax elements:

abs_mvd_greater0_flag:[0;1]
abs_mvd_greater1_flag:[0;1]
abs_mvd_minus1:[0;n]
mvd_sign:[0;1]

where in the case that the flag "abs_mvd_greater0_flag" is at zero, the value of mvd will be inferred to zero, and in the case the flag "abs_mvd_greater1_flag" is at zero, the value of mvd will be inferred to one. The value of abs_mvd_minus1 is in the range 0 to n, where n for example depends on the decoding context.

Thus the decoding context data provided by the module 206' for example indicates the motion vectors of previously decoded macroblocks. The coverage update notifications also provided by the module 206' for example indicate the zones of the image selected as reference zones based on previously generated motion vectors. The coverage context data for example indicates uncovered zones of the image that are of interest for testing and that should be covered by the test stream.

In order to generate a motion vector for a current macroblock, the module 206' for example transmits a request to the context-aware pseudo-random generator 202 for the four syntax elements indicated above. The generator 202 then determines, based on the decoding context, the value of n, and then for example request the distribution law from the coverage controller 602. The coverage controller 602 for example generates the distribution law based on the coverage context data provided by the coverage analysis block 604 and based on the decoding context. For example, based on the decoding context, the coverage controller 602 is able to calculate the current motion vector predictor values mvp[0] and mvp[1]. It is thus able to determine the values of the syntax elements that are most likely to result in untested motion vectors that lead to the selection of zones of the reference image that are of interest for testing, as indicated by the coverage context data.

Figure 8B:
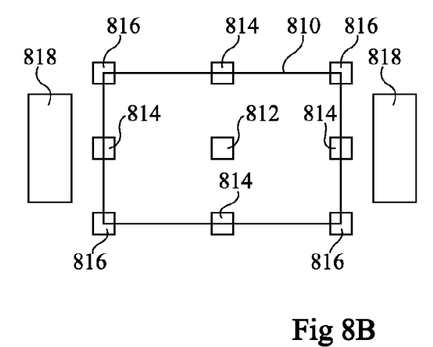
FIG. 8B illustrates an example of picture areas corresponding to motion vectors to be tested according to an example embodiment.

FIG. 8B illustrates a reference image 810 and provides an example of image zones of interest for testing as reference zones based on motion vectors. It is for example of interest that motion vectors are tested that result in a reference zone 812 being selected falling in the centre of the image, reference zones 814 being selected falling on each edge of the image, reference zones 816 being selected falling at each corner of the image, and reference zones 818 being selected falling to the left and right of the image.

An advantage of the embodiments described herein is that, by providing a test video stream generator that uses parts of a video decoder and parts of a video encoder, a test stream having a valid format can be generated in a simple manner. By pseudo-randomly generating the values of syntax elements, a broad test coverage can be achieved without the need to base the test stream on any uncompressed video source. Furthermore, by using context data from the syntax decoder, constraints can be imposed on the generation of syntax elements to ensure that a valid stream is created.

Furthermore, by adapting the distribution law used to pseudo-randomly generate the syntax elements, test coverage can be improved and/or the length of the test stream for a given test coverage can be reduced, thus reducing the validation time.

Having thus described at least one illustrative embodiment, various alterations, modifications and improvements will readily occur to those skilled in the art.

For example, it will be apparent to those skilled in the art that the various features described in relation to the various embodiments could be combined, in alternative embodiments, in any combination.

The invention claimed is:

1. A test stream generator for generating a compressed video stream for testing a video decoder, the generator comprising:
   a context-aware pseudo-random generator (202) adapted to generate pseudo-random values of syntax elements based on decoding context data, each pseudorandom value being generated to fall within a range indicated by the decoding context data;
   a decoding process module (206, 206') adapted to process the syntax element values and to generate the decoding context data and binarization context data, the binarization context data providing a mapping between syntax element values and bit sequences of the compressed video stream; and
   a binarizer module (204) adapted to encode the syntax element values based on the binarization context data in order to generate said compressed video stream.

2. The test stream generator of claim 1, wherein the decoding process module (206) is further adapted to generate a decompressed video output based on the syntax element values.

3. The test stream generator of claim 1, wherein the binarizer module (204) and the decoding process module (206) are adapted to process the syntax elements according to the HEVC (high efficiency video coding) standard.

4. The test stream generator of claim 1, wherein the context-aware pseudo-random generator (202) is adapted to generate one or more of the pseudo random values based on a probability distribution law, the test stream generator further comprising a coverage controller (602) adapted to define at least part of said probability distribution law for one or more of said syntax elements.

5. The test stream generator of claim 4, wherein the coverage controller (602) is adapted to generate the probability distribution law based on the decoding context data and based on coverage context data indicating non-covered items to be covered by the decoding process module.

6. The test stream generator of claim 5, further comprising a coverage analysis module (604) adapted to generate the coverage context data based on one or more notifications provided by the decoding process module (206, 206') indicating the extent of test coverage.

7. The test stream generator of claim 5, wherein the one or more pseudo-random values are values to be used for the calculation of one or more motion vectors by the decoding process module (206, 206'), the motion vectors are used by the decoding process module (206, 206') to select zones of a reference image, and wherein the coverage context data indicates one or more zones of the reference image not yet selected and to be covered by the test stream.

8. A method of generating, by a test stream generator, a compressed video stream for testing a video decoder, the method comprising:
   generating, by a context-aware pseudo-random generator (202), pseudo-random values of syntax elements based on decoding context data, each pseudorandom value being generated to fall within a range indicated by the decoding context data;
   processing, by a decoding process module (206), the syntax element values to generate the decoding context data and binarization context data, the binarization context data providing a mapping between syntax element values and bit sequences of the compressed video stream; and
   encoding, by a binarizer module (204), the syntax element values based on the binarization context data in order to generate said compressed video stream.

9. The method of claim 8, further comprising requesting, by the decoding process module (206), the syntax element values from the context-aware pseudo-random generator (202).

10. The method of claim 8, wherein generating the one or more pseudo-random values by the context-aware pseudo-random generator (202) is based on a probability distribution law, the method further comprising defining, by a coverage controller (602), at least part of said probability distribution law for one or more of said syntax elements.

11. The method of claim 10, wherein generating the probability distribution law by the coverage controller (602) is based on the decoding context data and on coverage context data indicating non-covered items to be covered by the decoding process module.

12. The method of claim 11, further comprising generating, by a coverage analysis module (604), the coverage context data based on one or more notifications provided by the decoding process module (206, 206') indicating the extent of test coverage.

13. The method of claim 11, wherein the one or more pseudo-random values are values to be used for the calculation of one or more motion vectors by the decoding process module (206, 206'), the motion vectors are used by the decoding process module (206, 206') to select zones of a reference image, and wherein the coverage context data indicates one or more zones of the reference image not yet selected and to be covered by the test stream.

14. A method of testing a decoder comprising:
   generating a compressed video stream according to the method of claim 8;
   decoding, by the decoder, the compressed video stream to generate a decompressed video output; and
   comparing the decompressed video output with a reference video output.

15. The method of claim 14, further comprising generating, by the decoding process module (206), the reference video output.

* * * * *